(12) United States Patent
Kikuchi

(10) Patent No.: US 10,771,563 B2
(45) Date of Patent: Sep. 8, 2020

(54) REMOTE OPERATION SYSTEM FOR SURVEYING INSTRUMENTS

(71) Applicant: TOPCON CORPORATION, Tokyo (JP)

(72) Inventor: Takeshi Kikuchi, Tokyo (JP)

(73) Assignee: TOPCON CORPORATION, Tokyo (JP)

( * ) Notice: Subject to any disclaimer, the term of this patent is extended or adjusted under 35 U.S.C. 154(b) by 101 days.

(21) Appl. No.: 16/267,916

(22) Filed: Feb. 5, 2019

(65) Prior Publication Data

US 2019/0306244 A1 Oct. 3, 2019

(30) Foreign Application Priority Data

Mar. 28, 2018 (JP) ................. 2018-061303

(51) Int. Cl.
*G06F 15/16* (2006.01)
*H04L 29/08* (2006.01)
*G01C 15/00* (2006.01)

(52) U.S. Cl.
CPC ............ *H04L 67/125* (2013.01); *G01C 15/00* (2013.01)

(58) Field of Classification Search
CPC ............................ H04L 67/125; G01C 15/00
See application file for complete search history.

(56) References Cited

U.S. PATENT DOCUMENTS

| 7,340,772 | B2 * | 3/2008 | Panasyuk | ................ G06F 21/31 726/15 |
| 7,447,500 | B2 * | 11/2008 | Endo | ..................... H04W 24/06 455/423 |
| 8,792,829 | B2 * | 7/2014 | Hirose | ................ H04L 43/0811 455/41.3 |
| 9,191,078 | B2 * | 11/2015 | Yamamoto | ............... H01Q 3/20 |

(Continued)

FOREIGN PATENT DOCUMENTS

| JP | 2007-170978 A | 7/2007 |
| JP | 2016-223904 A | 12/2016 |

*Primary Examiner* — Moustafa M Meky
(74) *Attorney, Agent, or Firm* — Roberts Calderon Safran & Cole P.C.

(57) ABSTRACT

Provided is a remote operation system for surveying instruments, capable of making surveying instruments execute a necessary operation even when communication with a management server fails. The remote operation system for surveying instruments includes at least one master surveying instrument, a management server, and a remote terminal, configured to communicate with each other via a first communication network, and at least one slave surveying instrument configured to communicate with the master surveying instrument via a second communication network, wherein the management server transmits a first operation command to make the slave surveying instrument execute a first predetermined operation to the master surveying instrument, the master surveying instrument transmits the operation command to the slave surveying instrument, and the master surveying instrument transmits a second operation command to make the slave surveying instrument execute a (Continued)

second predetermined operation to the slave surveying instrument when communication with the management server fails.

8 Claims, 13 Drawing Sheets

(56) References Cited

U.S. PATENT DOCUMENTS

| | | | |
|---|---|---|---|
| 2006/0094416 A1* | 5/2006 | Endo | H04W 24/06 455/423 |
| 2007/0198656 A1* | 8/2007 | Mazzaferri | G06F 9/54 709/218 |
| 2013/0050513 A1* | 2/2013 | Hayashi | H04L 41/042 348/207.11 |
| 2014/0017994 A1* | 1/2014 | Li | H04B 5/0043 455/41.1 |
| 2014/0335786 A1* | 11/2014 | Hirose | H04N 1/00347 455/41.1 |
| 2016/0006603 A1* | 1/2016 | Allen | H04L 41/0668 370/216 |
| 2018/0024513 A1* | 1/2018 | Tung | H04L 1/1848 702/81 |

* cited by examiner

Fig. 6B

| Device name | Connection status | Operation contents | Operation status |
|---|---|---|---|
| LM | Connected | Measure at 1-hour intervals | Finished at 18:00 |
| F.M.₁ | Connected | Measure at 1-hour intervals | Finished at 18:00 |
| F.M.₂ | Connected | Measure at 1-hour intervals | Finished at 18:00 |
| F.M.₃ | Connected | Measure at 5-minute intervals | Finished at 18:45 |
| F.M.₄ | Connected | Measure at 30-minute intervals | Start at 19:00 |
| F.M.₅ | Stopped | | |
| F.M.₆ | Connected | Measure at 1-hour intervals | Finished at 18:00 |
| F.M.₇ | Stopped | | |

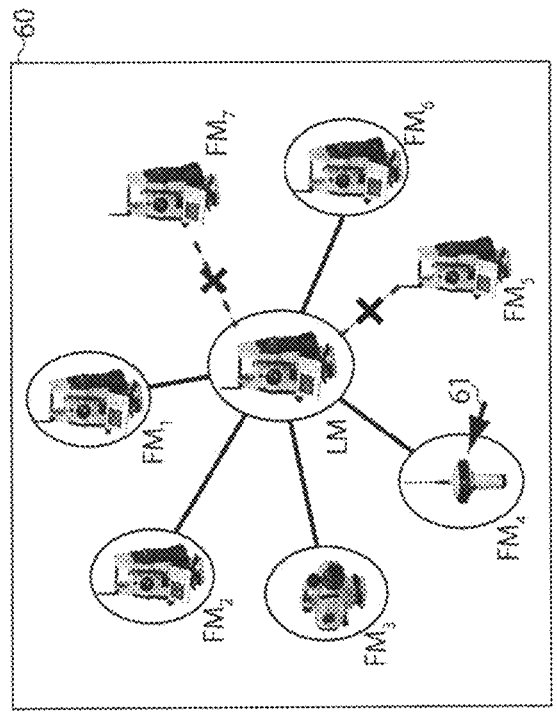

| Communication pattern | B1 | B2 | B3 |
|---|---|---|---|
| A1 | X1 | X2 | X3 |
| A2 | X4 | X5 | X6 |

Fig. 16B

| Communication pattern | D1 | D2 | D3 |
|---|---|---|---|
| C1 | Y1 | Y2 | Y3 |

Fig. 16C

| Communication pattern | X1 | X2 | X3 | X4 | X5 | X6 |
|---|---|---|---|---|---|---|
| Y1 | Z1 | Z2 | Z3 | Z4 | Z5 | Z6 |
| Y2 | Z7 | Z8 | Z9 | Z10 | Z11 | Z12 |
| Y3 | Z13 | Z14 | Z15 | Z16 | Z17 | Z18 |

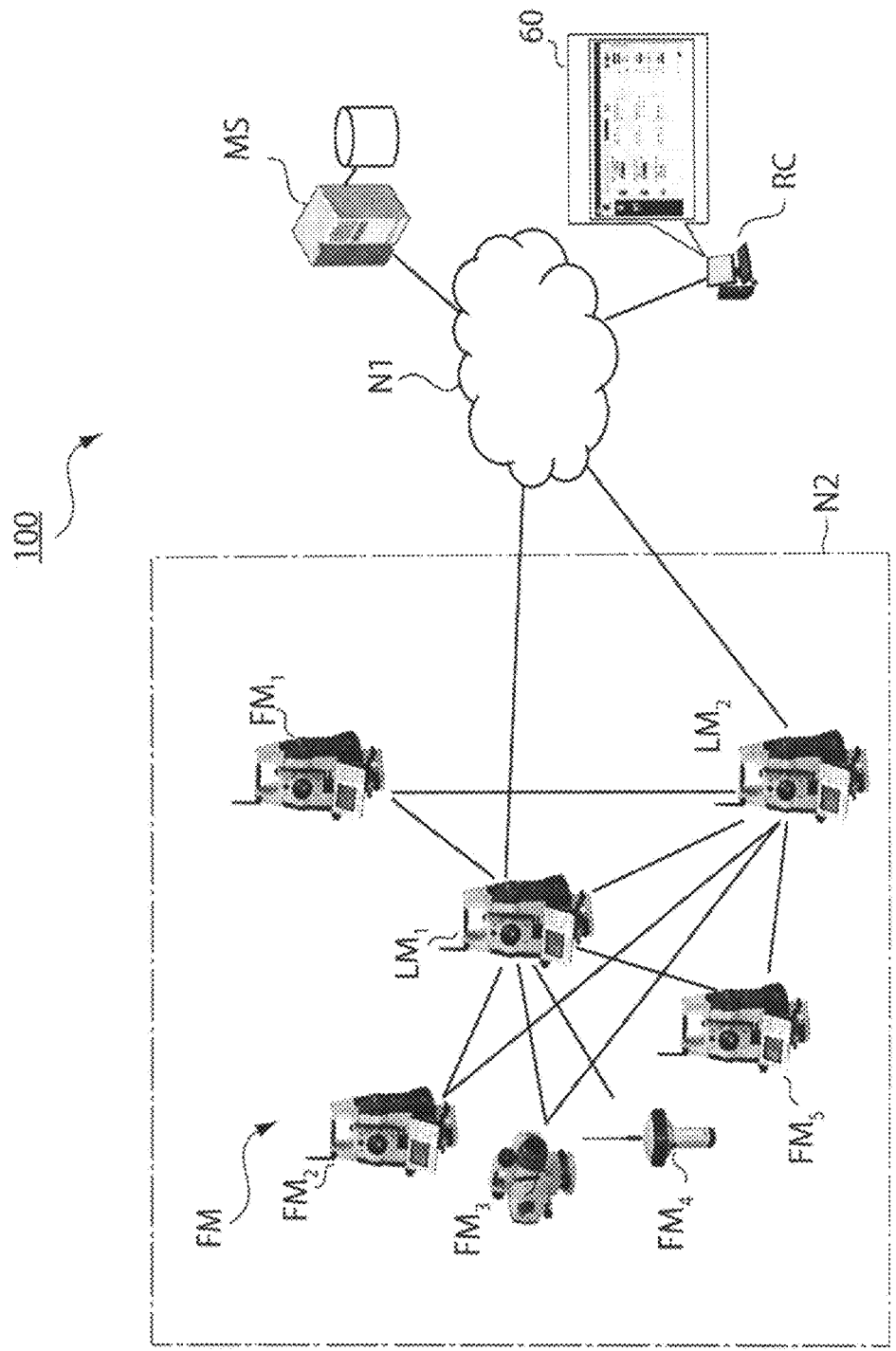

REMOTE OPERATION SYSTEM FOR SURVEYING INSTRUMENTS

CROSS-REFERENCE TO RELATED APPLICATAIONS

The present application claims priority under 35 U.S.C. § 119 to Japanese Patent Application No. 2018-61303 filed Mar. 28, 2018. The contents of this application are incorporated herein by reference in their entirely.

BACKGROUND OF INVENTION

Technical Field

The present invention relates to a remote operation system to operate a plurality of surveying instruments from a remote site.

Background Art

In recent years, systems that remotely operate and manage surveying instruments via a communication network such as the Internet and LAN have been proposed (refer to Japanese Published Unexamined Patent Application Nos. 2007-170978 and 2016-223904).

For example, Japanese Published Unexamined Patent Application No. 2016-223904 discloses a system that enables communication between a plurality of surveying instruments and a management server via the Internet, and makes the surveying instruments execute predetermined operations from a remote site. However, the remote operation system described in Japanese Published Unexamined Patent Application No. 2016-223904 has a problem in which when instruction information is received from the management server, a predetermined operation is executed and information is transmitted/received, but if communication with the management server fails due to the management server being stopped or the Internet being disconnected for some reason, the transmission/reception of information can no longer be performed, which disables the surveying instruments from executing necessary operations.

Therefore, there have been demands for a remote operation system for surveying instruments capable of executing necessary operations even when communication between the surveying instruments and a management server fails.

SUMMARY OF THE INVENTION

Technical Problem

The present invention was made in view of the above-described circumstances, and an object thereof is to provide a remote operation system for surveying instruments, capable of making surveying instruments execute necessary operations even when communication between the surveying instrument and a management server fails.

Solution to Problem

In order to solve the above-described problem, a remote operation system for surveying instruments according to an aspect of the present invention includes at least one master surveying instrument, a management server, and a remote terminal, configured to communicate with each other via a first communication network, and at least one slave surveying instrument configured to communicate with the master surveying instrument via a second communication network. The management server transmits a first operation command to make the slave surveying instrument execute a first predetermined operation to the master surveying instrument, the master surveying instrument transmits the operation command to the slave surveying instrument, and the master surveying instrument transmit a second operation command to make the slave surveying instrument execute a second predetermined operation to the slave surveying instrument when communication with the management server fails.

In the aspect described above, it is also preferable that the management server transmits, to the master surveying instrument, a transmission command to transmit data on the first predetermined operation to the management server, the master surveying instrument transmits the data to the management server based on the transmission command, and the master surveying instrument stands by for transmission of the data and store data on the second predetermined operation when communication with the management server fails.

Additionally, in the aspect described above, it is also preferable that the master surveying instrument executes data transmission for which the master surveying instrument stands by when communication with the management server is restored.

Additionally, in the aspect described above, it is also preferable that the master surveying instrument stores the data in a compressed format according to date while communication with the management server is in failure, and transmits the data in the compressed format when the communication with the management server is restored.

Benefit of Invention

According to the configuration described above, a remote operation system for surveying instruments, capable of making surveying instruments continue necessary operations even when communication with a management server fails, can be provided.

BRIEF DESCRIPTION OF THE DRAWINGS

FIGS. 6A and 6B are views illustrating examples of webpages to be displayed on a display unit of the remote terminal according to the same embodiment.

FIGS. 16A to 16C are tables illustrating combinations of communication patterns among the management server, the master surveying instrument, and the slave surveying instrument of the remote operation system according to the same embodiment.

FIG. 17 is a view illustrating an entire configuration of a remote operation system for surveying instruments according to a modification of the same embodiment.

DESCRIPTION OF THE EMBODIMENTS

Hereinafter, a preferred embodiment of the present invention is described with reference to the drawings, however, the present invention is not limited to this.

Embodiment

Entire Configuration of Remote Operation System

Figure 1:
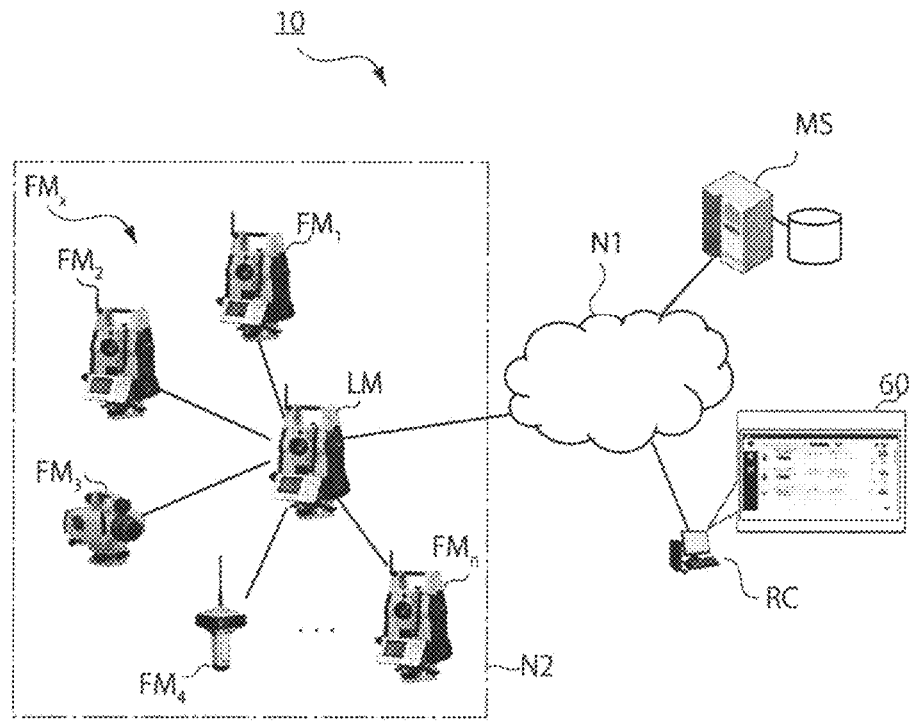
FIG. 1 is a view illustrating an entire configuration of a remote operation system according to an embodiment of the present invention.

FIG. 1 is a view illustrating an entire configuration of a remote operation system for surveying instruments (hereinafter, referred to also as "system," simply) 10 according to a first embodiment of the present invention. As illustrated in FIG. 1, the system 10 includes a master surveying instrument LM, slave surveying instruments $FM_1$, $FM_2$, $FM_3$, . . . , $FM_n$ (hereinafter, all slave surveying instruments are denoted by reference sign FM, and an arbitrary slave surveying instrument is denoted by reference sign $FM_X$), a management server MS, and a remote terminal RC. The master surveying instrument LM, the management server MS, and the remote terminal RC are configured to communicate with each other via a first communication network N1.

The first communication network N1 enables communication between the communication server MS, the remote terminal RC, and the master surveying instrument LM. A second communication network N2 enables communication between at least one master surveying instrument and at least one slave surveying instrument.

As the first communication network N1 and the second communication network N2, the Internet, a Local Area Network, a Wide Area Network, a satellite communications network, etc., can be applied, and these may be combined in a complex manner. Further, the first communication network N1 and the second communication network N2 may be wired communications using cables, or wireless communications configured by Bluetooth (registered trademark), Wi-Fi, etc.

Configuration of Master Surveying Instrument

Figure 2:
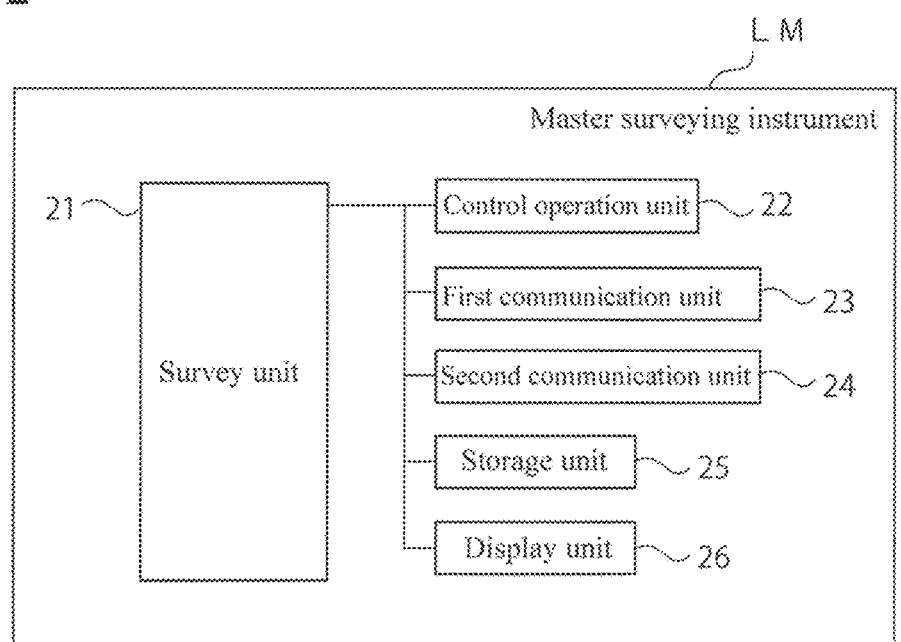
FIG. 2 is a configuration block diagram of a master surveying instrument according to the same embodiment.

FIG. 2 is a configuration block diagram of the master surveying instrument LM according to the present embodiment. In an example illustrated in FIG. 1, the master surveying instrument LM is a total station (electronic distance and angle measuring instrument). The master surveying instrument LM includes at least a survey unit 21, a control operation unit 22, a first communication unit 23, a second communication unit 24, a storage unit 25, and a display unit 26.

The survey unit 21 has a publicly known configuration as a survey unit of a total station as described in, for example, Japanese Published Unexamined Patent Application No. 2007-170978. In detail, the survey unit 21 includes a light emitting element, a distance measuring optical system, and a light receiving element disposed inside a telescope configured to be rotatably driven. The survey unit 21 emits a distance measuring light from the light emitting element via the distance measuring optical system to irradiate a target such as a reflecting prism, etc., and receives a reflected light from the target by the light receiving element, so as to perform a distance measurement. In addition, the survey unit 21 performs an angle measurement by measuring a vertical rotation angle of the telescope and a horizontal rotation angle of a housing (not illustrated) of the telescope by rotary encoders.

The control operation unit 22 is a control unit that includes at least a CPU (Central Processing Unit) as a processor, a RAM (Random Access Memory) and a ROM (Read-Only Memory) as storage devices, etc. The control operation unit 22 stores various programs such as a survey application program in the ROM and RAM, reads the programs by the CPU, and executes the programs on the CPU to control a survey operation and various operations to be executed by the master surveying instrument LM.

In addition, the control operation unit 22 transmits/receives information to/from the management server MS via the first communication network N1 by using the first communication unit 23. The control operation unit 22 executes a command from the management server MS.

In addition, the control operation unit 22 transmits/receives information to/from the slave surveying instrument $FM_X$ via the second communication network N2 by using the second communication unit 24.

In addition, the control operation unit 22 executes a predetermined operation based on a command received from the management server MS. For example, the control operation unit performs a measurement of a measurement target at predetermined intervals in a predetermined period.

In addition, the control operation unit 22 transmits a command to make the slave surveying instrument execute a predetermined operation out of commands received from the management server MS, and makes the slave surveying instrument $FM_X$ execute the predetermined operation. In addition, the control operation unit receives data on results of the operation of the slave surveying instrument.

The first communication unit 23 enables communications with the management server MS and the remote terminal RC via the first communication network N1. Data transmission/reception between the master surveying instrument LM and each of the management server MS and the remote terminal RC are executed via the first communication unit 23.

The second communication unit 24 enables communications with the slave surveying instrument $FM_X$ via the second communication network N2. Data transmission/reception between the master surveying instrument LM and each slave surveying instrument $FM_X$ are executed via the second communication unit 24.

The storage unit 25 is an auxiliary storage device, for example, an HDD (Hard Disk Drive), a flash memory, etc. The storage unit 25 stores survey data and other data acquired by the master surveying instrument LM itself, survey data and other data received from the slave surveying instrument $FM_X$.

The display unit 26 is, for example, a liquid crystal display, and displays various data on measurements such as measurement results and measurement conditions, etc., and a setting screen.

Configuration of Slave Surveying Instrument

Figure 3:
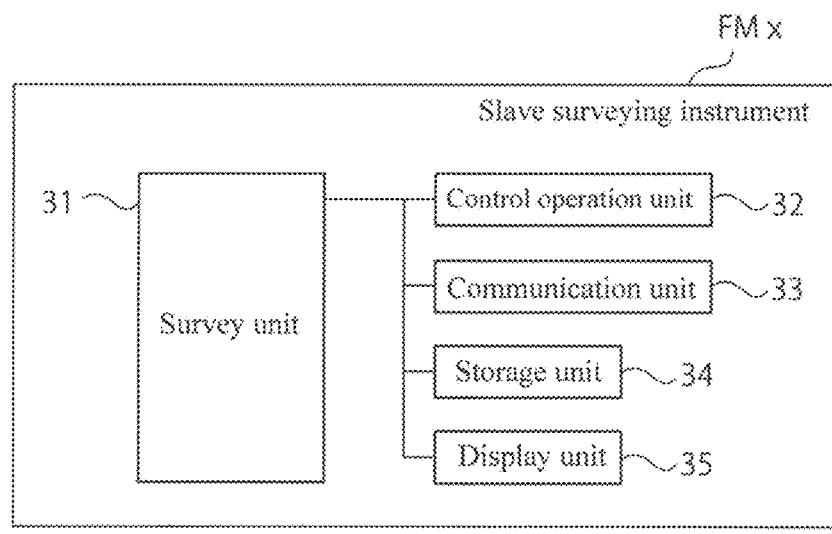
FIG. 3 is a configuration block diagram of a slave surveying instrument according to the same embodiment.

FIG. 3 is a configuration block diagram of a slave surveying instrument $FM_X$ according to the present embodiment. As illustrated also in FIG. 1, as the slave surveying instrument $FM_X$, various surveying instruments such as a total station, an electronic level, a GNSS (Global Navigation Satellite System) device, etc., can be properly selected according to a measurement range and purpose, etc., and the number and the kind of slave surveying instruments can be properly changed. In the example illustrated in FIG. 1, the slave surveying instruments $FM_1$, $FM_2$, and $FM_5$ are total stations, the $FM_3$ is an electronic level, and $FM_4$ is a GNSS device.

Regardless of the kind of the surveying instrument, the slave surveying instrument $FM_X$ includes at least a survey unit 31, a control operation unit 32, a communication unit 33, a storage unit 34, and a display unit 35.

The survey unit 31 differs depending on the kind of the slave surveying instrument. For example, when the slave surveying instrument is a total station like the slave surveying instruments $FM_2$, $FM_2$, and $FM_5$, the survey unit 31 has a publicly known configuration as a survey unit of a total station, like the survey unit 21 of the master surveying instrument LM. The survey unit 31 emits a distance measuring light from a light emitting element to irradiate a target such as a reflecting prism, and receives a reflected light from the target by a light receiving element, so as to perform a distance measurement. In addition, the survey unit 31 performs an angle measurement by measuring a vertical rotation angle and a horizontal rotation angle of the telescope by respective rotary encoders.

When the slave surveying instrument is an electronic level like the slave surveying instrument $FM_3$, the survey unit 31 has a publicly known configuration as a survey unit of an electronic level as described in, for example, Japanese Published Unexamined Patent Application No. 2013-221831. That is, the survey unit 31 includes a telescope, a light emitting unit, and an automatic collimation unit, etc., and automatically reads a leveling rod located at a measurement point, and measures a difference in level.

When the slave surveying instrument is a GNSS device like the slave surveying instrument $FM_4$, the survey unit 31 has a publicly known configuration as a GNSS device as described in, for example, Japanese Published Unexamined Patent Application No. 2004-317237. That is, the survey unit 31 receives navigation signals transmitted on radio waves from a plurality of navigation satellites and measure times of the transmissions to acquire its own positioning data.

Therefore, in the present specification, "the slave surveying instrument $FM_X$ performs a measurement" means that the slave surveying instrument $FM_X$ performs a measurement appropriate to the kind of each surveying instrument. For example, when the slave surveying instrument $FM_X$ is a total station, it means measuring a distance and an angle to a set measurement target, and when the slave surveying instrument $FM_X$ is an electronic level, it means measuring a difference in level of a set point, and when the slave surveying instrument is a GNSS device, it acquires its own positioning data.

The control operation unit 32 is a control unit including at least a CPU as a processor and a RAM and a ROM, etc., as storage devices. The control operation unit 32 stores various programs such as a survey application program in the ROM and RAM, and reads the programs by the CPU and executes the programs on the CPU to execute a measuring operation and various operations of the slave surveying instrument.

The control operation unit 32 executes predetermined operations of the slave surveying instrument $FM_X$ based on commands received from the master surveying instrument LM. In addition, the control operation unit 32 transmits measurement data and other data to the master surveying instrument LM, based on a command received from the master surveying instrument.

The communication unit 3 is a communication device to enable the slave surveying instrument $FM_X$ to communicate with the master surveying instrument LM, by using a method of, for example, Bluetooth (registered trademark), Wi-Fi, and a connection cable, etc.

The storage unit 34 is, for example, an HDD, a flash memory, etc. The storage unit 34 stores survey data and other data acquired by the slave surveying instrument $FM_X$.

The display unit 35 is, for example, a liquid crystal display, and displays various data on measurements, such as measurement results and measurement conditions, etc., and a setting screen.

Configuration of Remote Terminal

Figure 4:
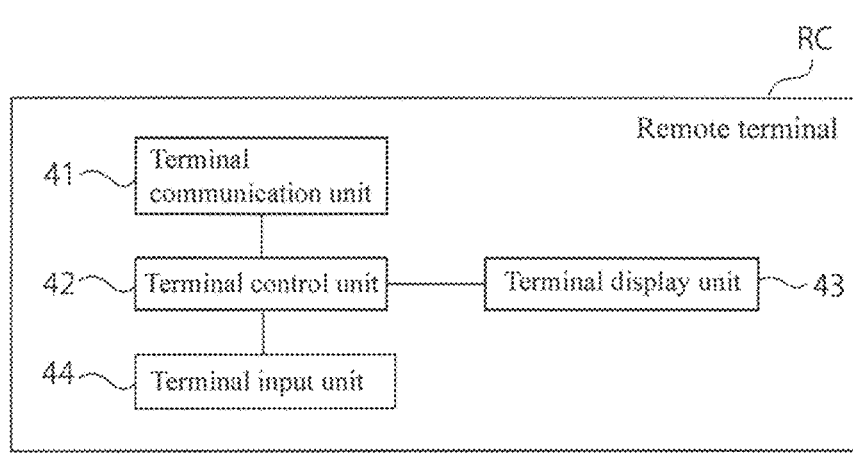
FIG. 4 is a configuration block diagram of a remote terminal according to the same embodiment.

FIG. 4 is a configuration block diagram of the remote terminal RC according to the present embodiment. The remote terminal RC is a terminal, for example, a personal computer, a smartphone, a tablet, etc. As illustrated in FIG. 3, the remote terminal RC includes at least a terminal communication unit 41, a terminal control unit 42, a terminal display unit 43, and a terminal input unit 44.

The terminal communication unit 41 is a communication device that enables information transmission/reception to/from a server communication unit 51 of the management server MS described later via the first communication network N1.

The terminal control unit 42 is a control unit including at least a CPU and a memory (ROM, RAM, etc.). The terminal control unit 42 instructs the terminal display unit 43 to display a dedicated webpage 60 for the system provided by a surveying instrument manufacturer, etc. The terminal control unit 42 instructs the management server MS to select the master surveying instrument LM and the slave surveying instrument $FM_X$ as targets to which commands are transmitted, sets contents of the commands that the master surveying instrument LM and the slave surveying instrument $FM_X$ are made to execute, and instructs transmission of the commands.

The terminal display unit 43 is, for example, a liquid crystal display, etc. The terminal display unit 43 displays an operation screen for a user including the dedicated webpage 60 for the system, based on a command from the terminal control unit 42.

The terminal input unit 44 is an input device such as a keyboard, a numeric keypad, a mouse, and a touch panel, etc. By the terminal input unit 44, information necessary for the operation of the remote terminal RC is input.

From the remote terminal RC, a user logs in to the dedicated webpage 60 for the system 10, and from the webpage 60, selects the master surveying instrument LM and the slave surveying instrument $FM_X$ as targets to which commands are transmitted, and sets contents of the commands that the master surveying instrument LM and the slave surveying instrument $FM_X$ are made to execute.

FIG. 6 illustrate examples of screens for selecting commands that the master surveying instrument LM and the slave surveying instrument $FM_X$ are made to execute. The webpage 60 may be configured so that a target surveying instrument can be selected by clicking the target surveying instrument with a mouse pointer 61 by a graphical user interface as illustrated in FIG. 6A. Alternatively, the webpage 60 may be configured so that a selected function and an operation status can be checked in a tabular form as illustrated in FIG. 6B.

Configuration of Management Server

Figure 5:
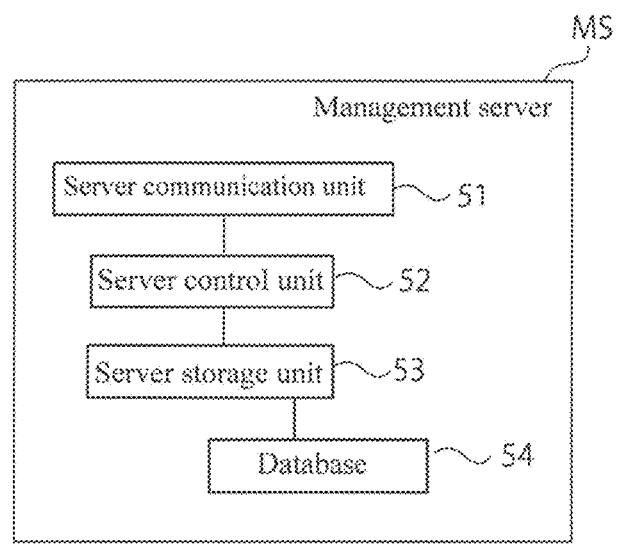
FIG. 5 is a configuration block diagram of a management server according to the same embodiment.

FIG. 5 is a configuration block diagram of the management server MS according to the present embodiment. The management server MS includes at least a server communication unit 51, a server control unit 52, and a server storage unit 53.

The server communication unit 51 can transmit/receive information to/from the first communication unit 23 of the master surveying instrument LM and the terminal communication unit 41 of the remote terminal RC via the first communication network N1.

The server control unit 52 is a control unit including at least a high-performance CPU and a memory (ROM, RAM, etc.). The server control unit 52 transmits commands to make the master surveying instrument LM and the slave surveying instrument $FM_X$ selected by the remote terminal RC execute set operations, to the master surveying instrument LM.

As the server storage unit 53, for example, an HDD, a solid-state drive, a semiconductor flash memory, Blu-ray Disc, etc., can be used. The server storage unit 53 stores data on commands to control function executions of the master surveying instrument LM and the slave surveying instrument $FM_X$, function setting data, and survey data acquired by both master and slave surveying instruments, etc.

The server storage unit 53 includes a database 54, and stores settings for the master surveying instrument LM and the slave surveying instrument $FM_X$ made by the remote terminal RC, and measurement data and other data of the master surveying instrument LM and the slave surveying instrument $FM_X$ received from the master surveying instrument LM respectively in association with identification numbers of the master surveying instrument LM and the slave surveying instrument $FM_X$.

Method of Remotely Operating Surveying Instrument

Hereinafter, a method of remotely operating a surveying instrument by the system 10 according to the present embodiment is described with reference to an example using the system 10 for fixed-point observation.

In this example, it is assumed that fixed-point observation is performed, with use of the system 10 illustrated in FIG. 1, for a plurality of points in a predetermined measurement field by using the master surveying instrument LM and the slave surveying instruments FM.

For example, the master surveying instrument LM and the slave surveying instruments FM are made to perform measurements for 6 months. The master surveying instrument LM and the slave surveying instruments $FM_1$, $FM_2$, and $FM_5$, which are total stations, perform measurements at 1-hour intervals, and transmit measurement data to the management server MS via the master surveying instrument. The slave surveying instrument $FM_3$ being an electronic level performs a measurement at 5-minute intervals, and transmits measurement data to the management server MS via the master surveying instrument LM. The slave surveying instrument $FM_4$ being a GNSS device performs a measurement at 2-hour intervals, and transmit measurement data to the management server MS via the master surveying instrument LM.

The system 10 has a plurality of communication patterns depending on a data transmission timing. Hereinafter, the communication patterns are described by classification into communication patterns A1 and A2 between the management server MS and the master surveying instrument LM and communication patterns B1, B2, and B3 between the master surveying instrument LM and the slave surveying instrument $FM_X$ when communication between the management server MS and the master surveying instrument LM is connected, and a communication pattern C1 between the management server MS and the master surveying instrument LM and communication patterns D1, D2, and D3 between the master surveying instrument LM and the slave surveying instrument $FM_X$ when communication between the management server MS and the master surveying instrument LM fails.

Figure 7:
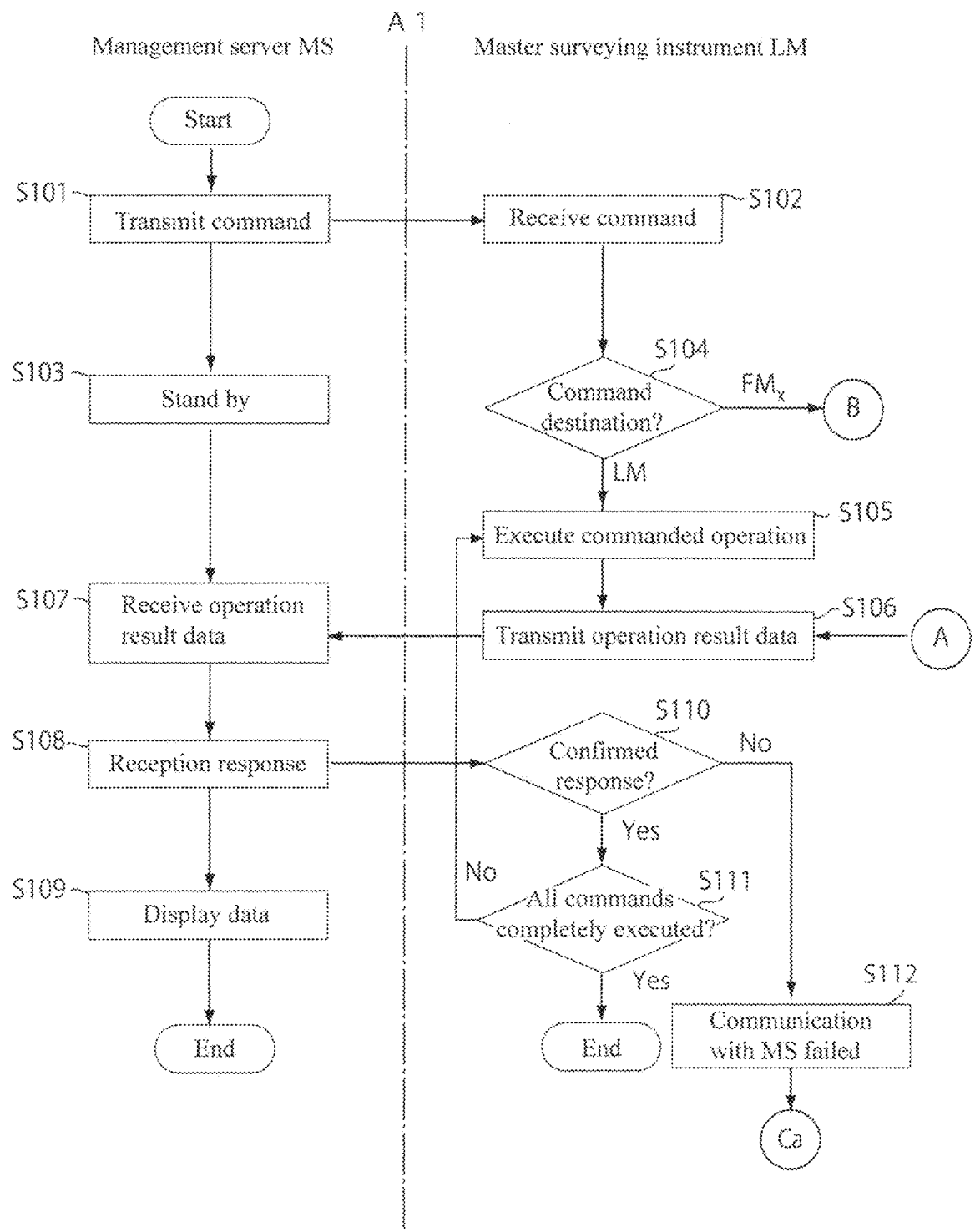
FIG. 7 is a flowchart illustrating an example of a communication pattern between the management server and the master surveying instrument in the remote operation system according to the same embodiment.

1. Communication Pattern A1 Between Management Server MS and Master Surveying Instrument LM FIG. 7 is a flowchart of operations of the management server MS and the master surveying instrument LM in the communication pattern A1.

In the communication pattern A1, the management server MS commands the master surveying instrument LM that the master surveying instrument LM perform a measurement at the set intervals in the set period, that the master surveying instrument LM transmit, to the slave surveying instrument $FM_X$, a command to make the slave surveying instrument $FM_X$ perform a measurement at the set intervals in the set period, and that the master surveying instrument LM transmit measurement data of the master surveying instrument LM and the slave surveying instrument $FM_X$ to the management server MS successively, that is, each time of measurement.

When the processing starts, in Step S101, the management server MS transmits a command input from the remote terminal RC to the master surveying instrument LM, and in Step S102, the master surveying instrument LM receives the command.

In the remote operation system 10 for surveying instruments according to the present embodiment, to ensure highly reliable communication, a method is employed in which at the time of data transmission/reception, when a receiver side receives data, the receiver side returns a reception response to a transmitter side, and the transmitter side confirms data transmission/reception by confirming the reception response. This method is publicly known, and description thereof is therefore omitted in the present specification except when particularly necessary.

The management server MS after transmitting the command shifts to Step S103 and stands by.

Next, in Step S104, the master surveying instrument LM judges a destination of the received command (whether the received command is addressed to the master surveying instrument LM itself or the slave surveying instrument $FM_X$).

For a command addressed to the slave surveying instrument $FM_X$, the processing shifts to Step S301 in the communication pattern B1, Step S401 in the communication pattern B2, or Step S501 in the communication pattern B3 via a combinator B.

For a command addressed to the master surveying instrument LM itself, by shifting to Step S105, the master surveying instrument LM executes a commanded operation, that is, a measurement according to the command addressed to the master surveying instrument LM itself.

After finishing the commanded operation, in Step S106, the master surveying instrument LM transmits data on the result of execution of the operation (hereinafter, referred to as "operation result data"), that is, measurement data acquired through the measurement to the management server MS that is standing by.

Next, in Step S107, when the management server MS receives the measurement data, the management server MS returns a reception response to the master surveying instrument LM in Step S108.

Next, in Step S109, the management server MS displays the result on the terminal display unit 43 of the remote terminal RC and ends the processing.

On the other hand, the master surveying instrument LM confirms the reception response from the management server MS in Step S110.

When the response is not confirmed (No) in Step S110, the master surveying instrument LM judges in Step S112 that communication with the management server MS has failed. Then, the processing shifts to Step S601 in the communication pattern C1, Step S701 in the communication pattern D1, Step S801 in the communication pattern D2, or Step S901 in the communication pattern D3, via a combinator Ca.

When the response is confirmed in Step S110 (Yes), the master surveying instrument LM judges whether all commands have been completely executed in Step S111. For example, in the case of a command to perform a measurement at predetermined intervals in a predetermined period, whether all measurements have been completed is judged.

When there is any command that has not been completely executed in Step S111 (No), the processing returns to Step S105, and the master surveying instrument LM continues the processing until all commands are completely executed.

When all commands have been completely executed in Step S111 (Yes), the master surveying instrument LM ends the processing.

Figure 8:
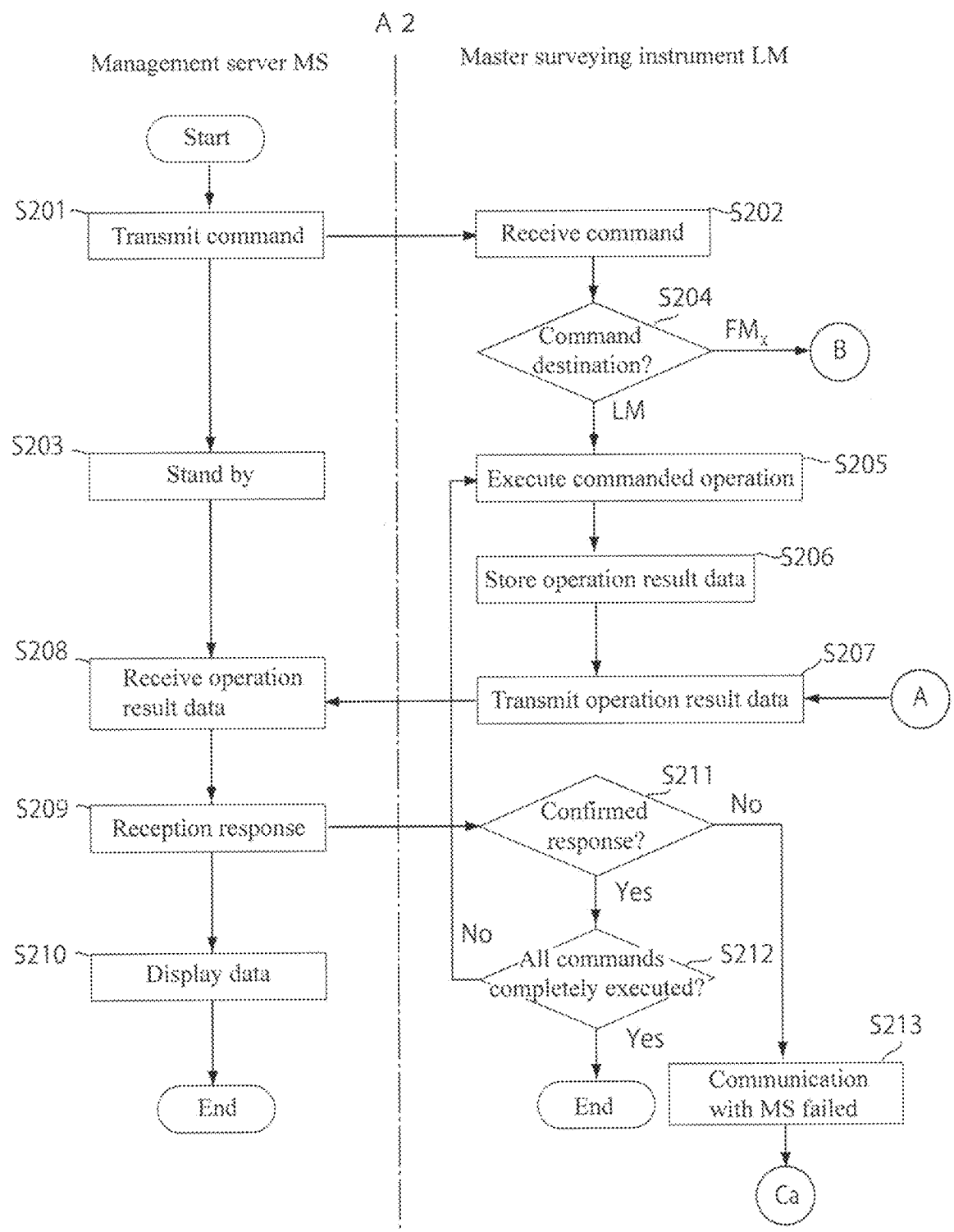
FIG. 8 is a flowchart illustrating another example of the communication pattern between the management server and the master surveying instrument in the remote operation system according to the same embodiment.

2. Communication Pattern A2 Between Management Server MS and Master Surveying Instrument LM FIG. 8 is a flowchart of operations of the management server MS and the master surveying instrument LM in the communication pattern A2.

In the communication pattern A2, the management server MS commands the master surveying instrument LM that the master surveying instrument LM perform a measurement at the set intervals in the set period, that the master surveying instrument LM transmit, to the slave surveying instrument $FM_X$, a command to make the slave surveying instrument $FM_X$ perform a measurement at the set intervals in the set period, and that the master surveying instrument LM transmit measurement data of the master surveying instrument LM and the slave surveying instrument $FM_X$ to the management server MS in accordance with a designated timing, for example, once a day at a designated time for each surveying instrument (at 12 midnight in the case of the master surveying instrument LM, and at 2 a.m. in the case of the slave surveying instrument FM1, etc.).

When the processing starts, in Step S201, the management server MS transmits a command input from the remote terminal RC to the master surveying instrument LM, and in Step S202, the master surveying instrument LM receives the command.

The management server MS after transmitting the commands shifts to Step S203 and stands by.

Next, in Step S204, the master surveying instrument LM judges a destination of the received command (whether the received command is addressed to the master surveying instrument LM itself or to the slave surveying instrument $FM_X$).

For a command addressed to the slave surveying instrument $FM_X$, the processing shifts to Step S301 in the communication pattern B1, Step S401 in the communication pattern B2, or Step S501 in the communication pattern B3 via a combinator B.

For a command addressed to the master surveying instrument LM itself, the processing shifts to Step S205, wherein the master surveying instrument LM executes a commanded operation, that is, a measurement, according to the command addressed to the master surveying instrument LM itself.

After finishing the commanded operation, in Step S206, the master surveying instrument LM stores operation result data, that is, measurement data acquired through the measurement to the management server MS that is standing by.

Next, in Step S207, the master surveying instrument LM transmits the stored operation result data in accordance with a commanded timing to the management server MS.

After receiving the operation result data in Step S208, the management server MS returns a reception response to the master surveying instrument LM in Step S209.

Next, in Step S210, the result is displayed on the terminal display unit 43 of the remote terminal RC, and the processing is ended.

On the other hand, the master surveying instrument LM confirms the reception response from the management server MS in Step S211.

When the response is not confirmed in Step S211 (No), the master surveying instrument LM judges in Step S213 that communication with the management server MS has failed. Then, the processing shifts to Step S601 in the communication pattern C1, Step S701 in the communication pattern D1, Step S801 in the communication pattern D2, or Step S901 in the communication pattern D3, via the combinator Ca.

When the response is confirmed in Step S211 (Yes), the master surveying instrument LM judges whether all commands have been completely executed in step S212. For example, in the present example, whether all measurements have been completed is judged.

When there is any command that has not been completely executed in Step S212 (No), the processing returns to Step S205, and the master surveying instrument LM repeats the processing until all commands are completely executed.

When all commands are completely executed in Step S212 (Yes), the master surveying instrument LM ends the processing.

Figure 9:
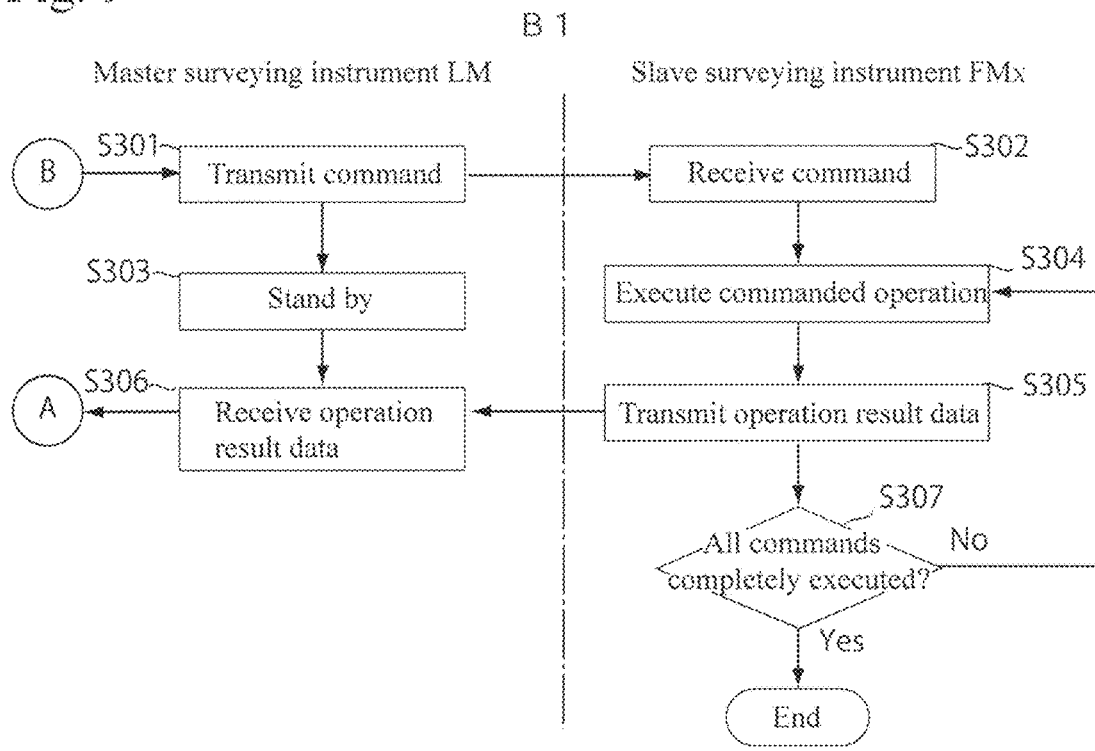
FIG. 9 is a flowchart illustrating an example of a communication pattern between the master surveying instrument and the slave surveying instrument of the remote operation system according to the same embodiment.

3. Communication Pattern B1 Between Master Surveying Instrument LM and Slave Surveying Instrument $FM_X$ FIG. 9 is a flowchart of operations of the master surveying instrument LM and the slave surveying instrument $FM_X$ in the communication pattern B1.

In the communication pattern B1, the master surveying instrument LM transmits a command addressed to the slave surveying instrument $FM_X$ received from the management server MS to the slave surveying instrument $FM_X$, and based on the command, the slave surveying instrument $FM_X$ executes a measurement as a predetermined operation, and transmits measurement data as operation result data successively, that is, each time of measurement, to the master surveying instrument LM.

In the communication patterns between the management server MS and the master surveying instrument LM, for a command judged to be addressed to the slave surveying instrument $FM_X$ in Step S104 or Step S204, the processing shifts to Step S301 via the combinator B, and in Step S301, the master surveying instrument LM transmits the command addressed to the slave surveying instrument $FM_X$ to the slave surveying instrument $FM_X$, and the slave surveying instrument $FM_X$ receives the command in Step S302.

After transmitting the command, the master surveying instrument LM shifts to Step S303 and stands by.

The slave surveying instrument $FM_X$ that received the command executes a commanded operation, that is, a measurement in Step S304.

After finishing the measurement, the slave surveying instrument $FM_X$ transmits data (operation result data) on the result of execution of the predetermined operation to the master surveying instrument LM in Step S305. In the present example, the slave surveying instrument $FM_X$ transmits measurement data acquired through measurements by the slave surveying instrument $FM_X$ successively, that is, each time of measurement to the master surveying instrument LM that is standing by.

The master surveying instrument LM receives the operation result data in Step S306. The operation result data of the slave surveying instrument $FM_X$, received by the master surveying instrument LM, is shifted to the processing of Step S106 in the communication pattern A1 or Step S207 in the communication pattern A2 via a combinator A, and transmitted from the master surveying instrument LM to the management server MS in Step S106 or Step S207, respectively.

After transmitting the operation result data in Step S305, the slave surveying instrument $FM_X$ judges in Step S307 whether all commands have been completely executed. In the present example, whether all measurements have been completed is judged.

When there is any command that has not been completely executed in Step S307 (No), the processing returns to Step S304, and the slave surveying instrument $FM_X$ repeats the processing until all commands are completely executed.

When all commands are completely executed in Step S307 (Yes), the master surveying instrument LM ends the processing.

Figure 10:
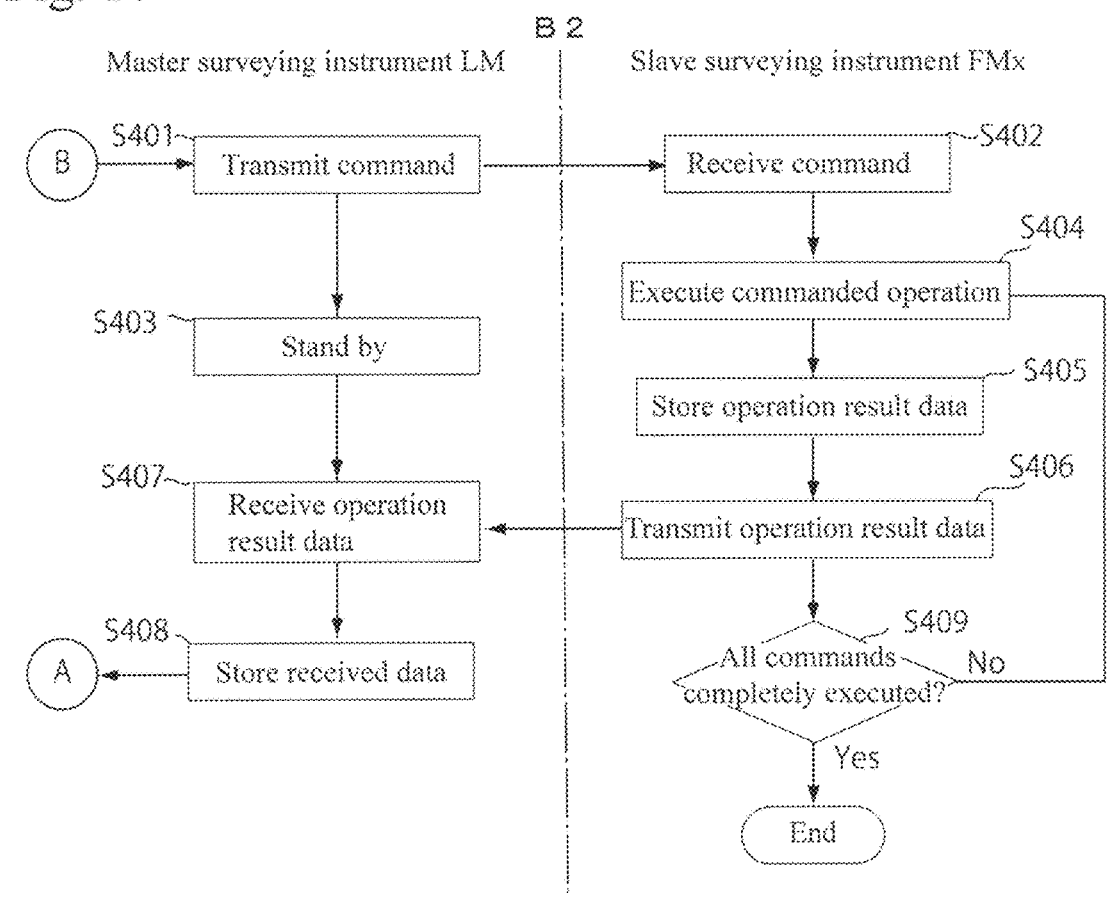
FIG. 10 is a flowchart illustrating another example of the communication pattern between the master surveying instrument and the slave surveying instrument of the remote operation system according to the same embodiment.

4. Communication Pattern B2 Between Master Surveying Instrument LM and Slave Surveying Instrument $FM_X$ FIG. 10 is a flowchart of operations of the master surveying instrument LM and the slave surveying instrument $FM_X$ in the communication pattern B2.

In the communication pattern B2, the master surveying instrument LM transmits a command addressed to the slave surveying instrument $FM_X$ received from the management server MS to the slave surveying instrument $FM_X$, and based on the command, the slave surveying instrument $FM_X$ executes a measurement as a predetermined operation, and transmits measurement data as operation result data in accordance with a designated timing (for example, once a day at 12 midnight, etc.) to the master surveying instrument LM.

In the communication patterns between the management server MS and the master surveying instrument LM, for a command judged to be addressed to the slave surveying instrument $FM_X$ in Step S106 or Step S206, the processing shifts to Step S401 via the combinator B, and in Step S401, the master surveying instrument LM transmits the command addressed to the slave surveying instrument $FM_X$ to the slave surveying instrument $FM_X$, and the slave surveying instrument $FM_X$ receives the command in Step S402.

After transmitting the command, the master surveying instrument LM shifts to Step S403 and stands by.

The slave surveying instrument $FM_X$ that received the command executes a commanded operation, that is, a measurement in Step S404.

After finishing the measurement, in Step S405, the slave surveying instrument $FM_X$ stores operation result data, that is, measurement data in the storage unit 34.

Next, in Step S406, the slave surveying instrument $FM_X$ transmits the stored operation result data to the master surveying instrument LM in accordance with a designated timing.

The master surveying instrument LM receives the operation result data in Step S407. The operation result data of the slave surveying instrument $FM_X$, received by the master surveying instrument LM, is stored in the storage unit 25 of the master surveying instrument LM in Step S408. The stored data is shifted to the processing of Step S106 or Step S207 via the combinator A, and transmitted from the master surveying instrument LM to the management server MS.

On the other hand, after transmitting the operation result data in Step S406, the slave surveying instrument $FM_X$ judges whether all commands have been completely executed in Step S409. In the present example, whether all measurements have been completed is judged.

When there is any command that has not been completely executed in Step S409 (No), the processing returns to Step S404, and the slave surveying instrument $FM_X$ repeats the processing until all commands are completely executed.

When all commands are completely executed in Step S409 (Yes), the master surveying instrument LM ends the processing.

Figure 11:
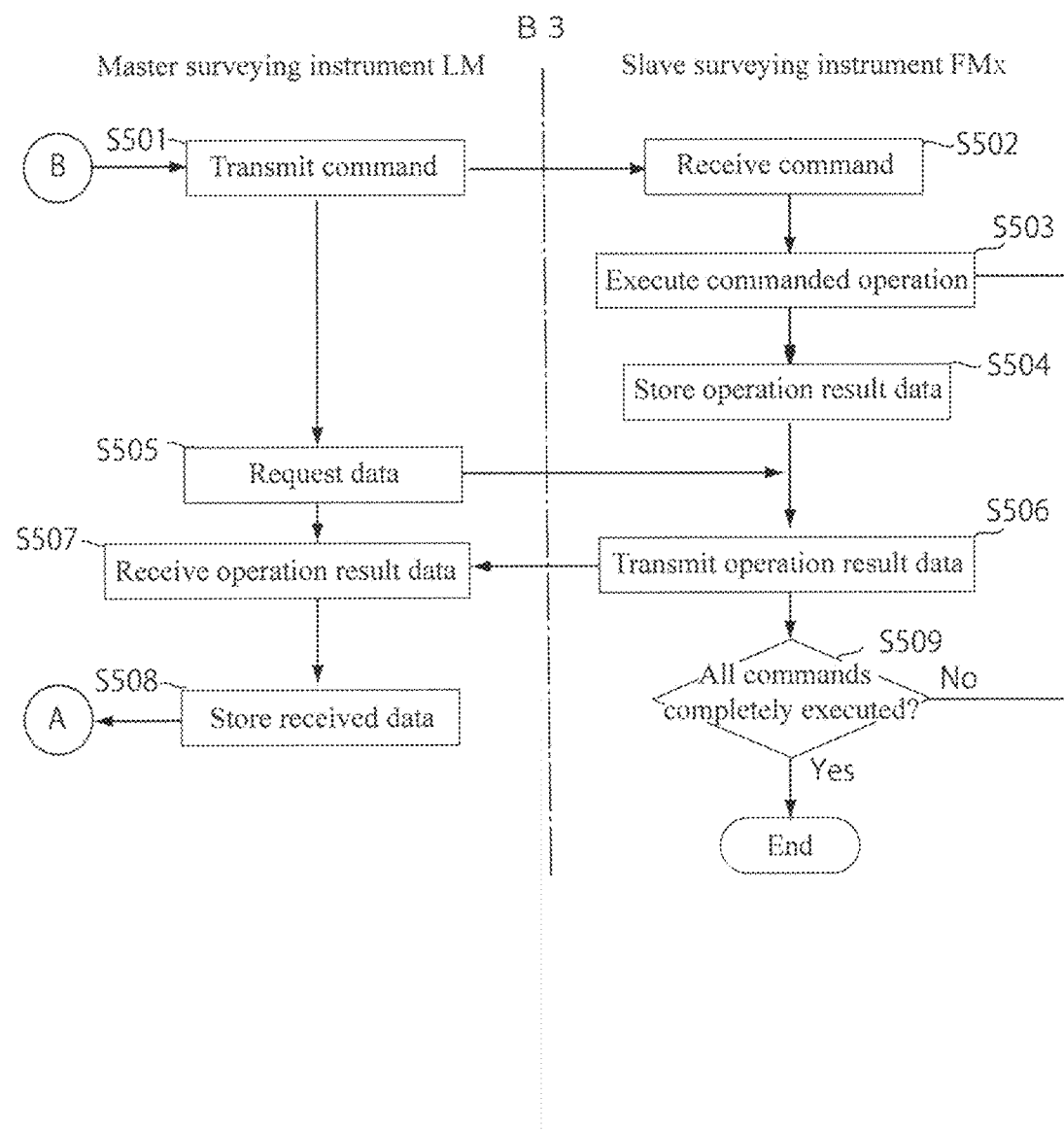
FIG. 11 is a flowchart illustrating still another example of the communication pattern between the master surveying instrument and the slave surveying instrument of the remote operation system according to the same embodiment.

5. Communication Pattern B3 Between Master Surveying Instrument LM and Slave Surveying Instrument $FM_X$ FIG. 11 is a flowchart of operations of the master surveying instrument LM and the slave surveying instrument $FM_X$ in the communication pattern B3.

In the communication pattern B3, the master surveying instrument LM transmits a command addressed to the slave surveying instrument $FM_X$ received from the management server MS to the slave surveying instrument $FM_X$, and based on the command, the slave surveying instrument $FM_X$ executes a measurement as a predetermined operation, and stores measurement data as operation result data. The master surveying instrument LM requests the measurement data of the slave surveying instrument $FM_X$ at a designated timing (for example, once a day at 12 midnight, etc.), and the slave surveying instrument $FM_X$ transmits the measurement data to the master surveying instrument LM upon request.

In the communication patterns between the management server MS and the master surveying instrument LM, for a command judged to be addressed to the slave surveying instrument $FM_X$ in Step S104 or S204, the processing shifts to Step S501 via the combinator B, and in Step S501, the master surveying instrument LM transmits the command addressed to the slave surveying instrument $FM_X$ to the slave surveying instrument $FM_X$, and the slave surveying instrument $FM_X$ receives the command in Step S502.

Next, the slave surveying instrument $FM_X$ executes a commanded operation, that is, a measurement in Step S503.

After finishing the measurement, in Step S504, the slave surveying instrument $FM_X$ stores operation result data, that is, measurement data in the storage unit 34.

In Step S505, the master surveying instrument LM requests the slave surveying instrument $FM_X$ to transmit the operation result data in accordance with a timing designated in advance.

In Step S506, the slave surveying instrument $FM_X$ transmits the operation result data upon request from the master surveying instrument LM.

After receiving the operation result data in Step S507, in the next Step S508, the master surveying instrument LM then stores the received data in the storage unit 25.

The stored operation result data of the slave surveying instrument $FM_X$ is shifted to the processing of Step S106 or Step S207 via the combinator A, and transmitted from the master surveying instrument LM to the management server MS.

After transmitting the operation result data in Step S506, the slave surveying instrument $FM_X$ judges in Step S507 whether all measurements have been completed.

When there is any command that has not been completely executed in Step S509 (No), the processing returns to Step S503, and the slave surveying instrument $FM_X$ repeats the processing until all commands are completely executed.

When all commands are completely executed in Step S509 (Yes), the master surveying instrument LM ends the processing.

Figure 12:
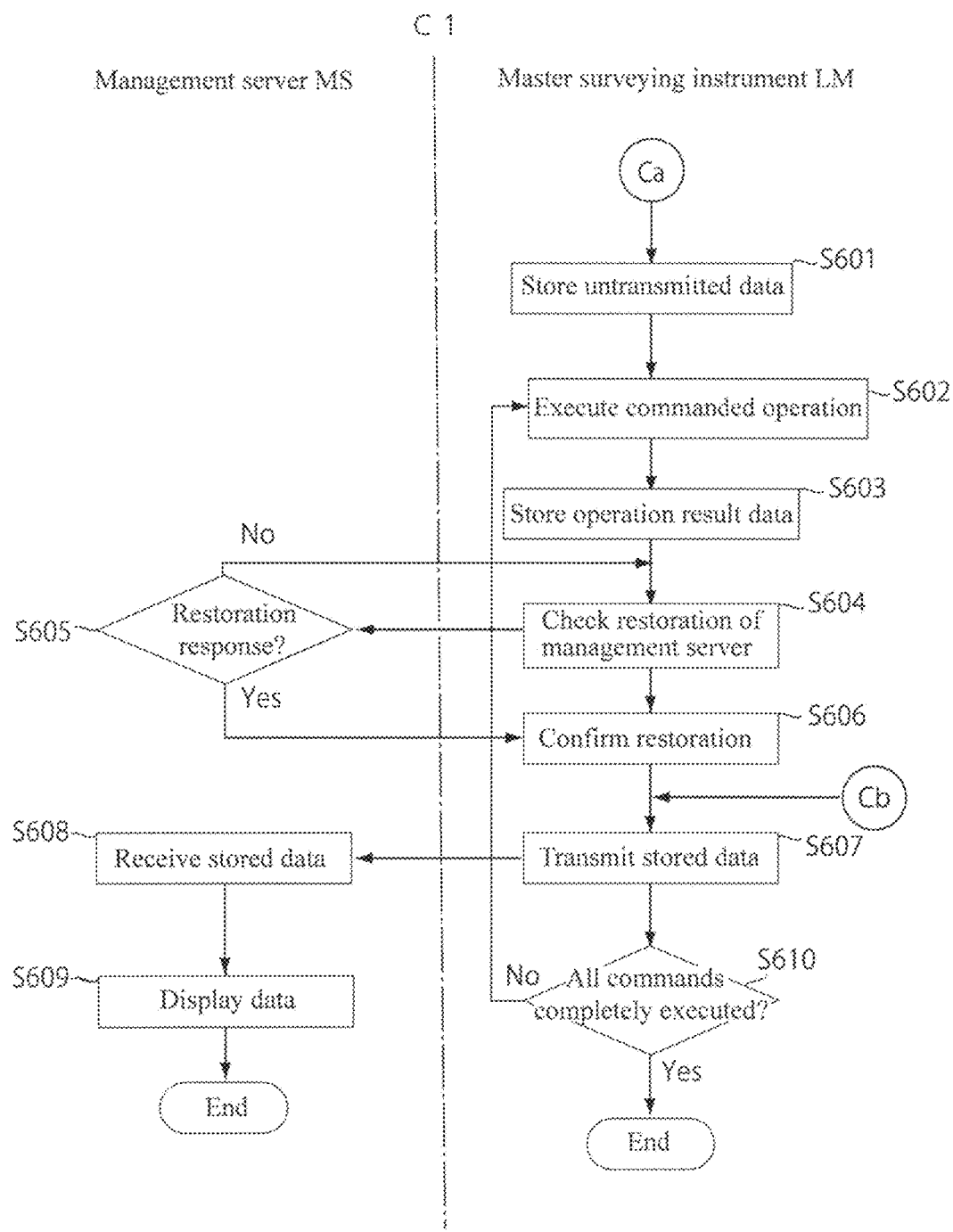
FIG. 12 is a flowchart illustrating an example of a communication pattern between the management server and the master surveying instrument when communication between the management server and the master surveying instrument fails in the remote operation system according to the same embodiment.

6. Communication Pattern C1 Between Management Server MS and Master Surveying Instrument LM FIG. 12 is a flowchart of operations of the management server MS and the master surveying instrument LM in the communication pattern C1.

The communication pattern C1 is a communication pattern between the management server MS and the master surveying instrument LM when communication between the management server MS and the master surveying instrument LM fails, and corresponds to a processing following the combinator Ca in the flowchart of the communication pattern A1 or A2.

In the communication pattern C1, when the master surveying instrument LM fails to communicate with the management server MS, the master surveying instrument LM stores data not yet transmitted at that timing and stands by, and after this, still continues the measurement and stores measurement data obtained due to the continuation, and when communication with the management server MS is restored, transmits the untransmitted data and the measurement data obtained during the communication failure period to the management server MS.

In Step S111 in the communication pattern A1 or Step S212 in the communication pattern A2, when the master surveying instrument LM fails to communicate with the management server MS, the processing shifts to Step S601 via the combinator Ca.

First, in Step S601, untransmitted data that fails to be transmitted in Step S106 or Step S207 is stored.

Next, in Step S602, the master surveying instrument LM executes a measurement as a predetermined operation previously instructed.

Next, in Step S603, the master surveying instrument LM stores measurement data as operation result data in the storage unit 25.

In Step S604, the master surveying instrument LM periodically checks if communication with the management server MS has been restored by transmitting a check signal.

In Step S605, when no restoration response signal is returned (No), the processing returns to Step S604, and the master surveying instrument LM repeats transmission of the check signal.

In Step S605, when a restoration response signal is returned (Yes), the master surveying instrument LM confirms in Step S606 that communication with the management server MS has been restored.

After the restoration of communication with the management server MS is confirmed, the master surveying instrument LM transmits data (stored data) stored in the master surveying instrument LM, such as the stored untransmitted data, operation result data of the master surveying instrument LM, and operation result data of the slave surveying instrument $FM_X$ acquired from the slave surveying instrument $FM_X$, to the management server MS.

In Step S608, the management server MS receives the data transmitted from the master surveying instrument LM. Then, in Step S609, the management server MS displays the received data on the terminal display unit 43 of the remote terminal RC, and ends the processing.

Figure 13:
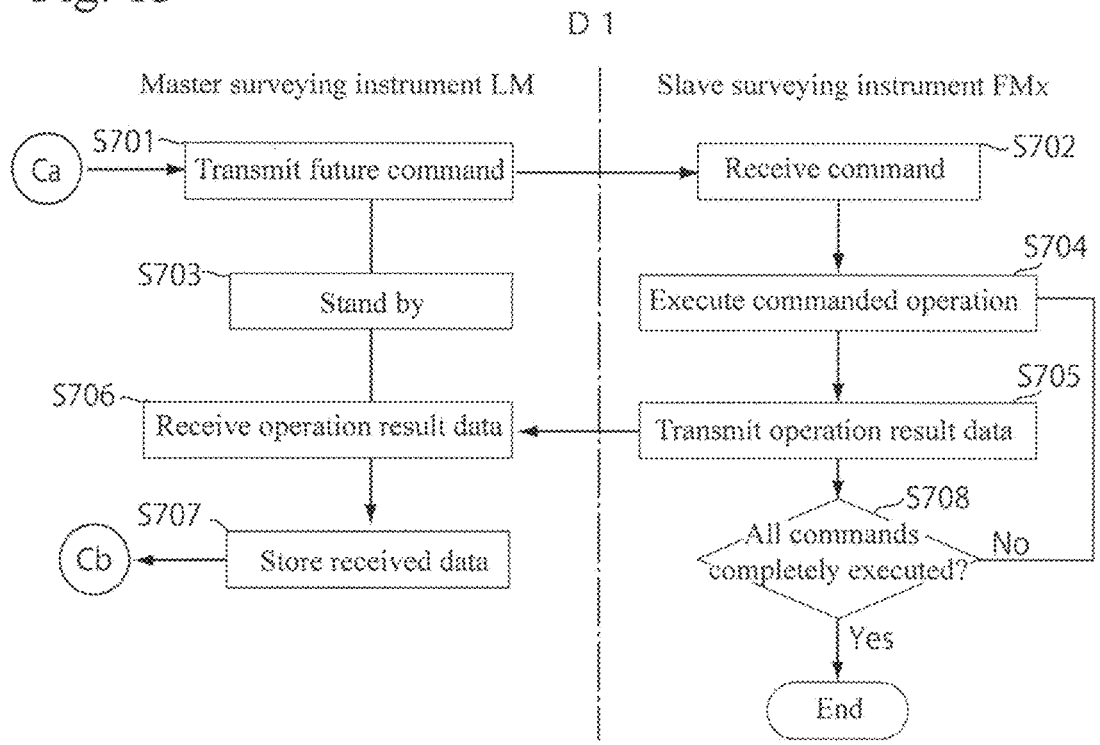
FIG. 13 is a flowchart illustrating an example of a communication pattern between the master surveying instrument and the slave surveying instrument when communication between the management server and the master surveying instrument fails in the remote operation system according to the same embodiment.

7. Communication Pattern D1 Between Master Surveying Instrument LM and Slave Surveying Instrument $FM_X$ FIG. 13 is a flowchart of operations of the master surveying instrument LM and the slave surveying instrument $FM_X$ in the communication pattern D1.

The communication pattern D1 is executed when communication between the management server MS and the master surveying instrument LM fails. The communication pattern D1 corresponds to processing following the combinator Ca in the flowchart of the communication pattern A1 or A2.

In the communication pattern D1, the master surveying instrument LM transmits, as second operation commands (future commands), to the slave surveying instrument $FM_X$, a command to make the slave surveying instrument $FM_X$ continue the measurement, and a command to make the slave surveying instrument $FM_X$ successively transmit operation result data to the master surveying instrument LM.

In Step S112 in the communication pattern A1 or Step S213 in the communication pattern A2, when the master surveying instrument LM fails to communicate with the management server MS, the processing shifts to Step S701 via the combinator Ca.

In Step S701, the master surveying instrument LM transmits a future command to the slave surveying instrument $FM_X$, and in Step S702, the slave surveying instrument $FM_X$ receives this command.

Thereafter, in Step S703, the master surveying instrument LM stands by. On the other hand, the slave surveying instrument $FM_X$ executes a measurement based on the future command in Step S704.

Next, in Step S705, the slave surveying instrument $FM_X$ transmits operation result data to the master surveying instrument LM that is standing by, successively, that is, each time of measurement, and in Step S706, the master surveying instrument LM receives the operation result data.

Next, in Step S707, the master surveying instrument LM stores the received data in the storage unit 25. The data stored in Step S707 is successively transmitted to the management server MS in Step 607 in the communication pattern C1 between the management server MS and the master surveying instrument LM, via a combinator Cb.

On the other hand, in Step S708, the slave surveying instrument $FM_X$ judges whether all commands have been completely executed. In the present example, whether all measurements have been completed is judged.

When there is any command that has not been completely executed in Step S708 (No), the processing returns to Step S704, and the slave surveying instrument $FM_X$ repeats the processing until all commands are completely executed.

When all commands are completely executed in Step S708 (Yes), the slave surveying instrument $FM_X$ ends the processing.

Figure 14:
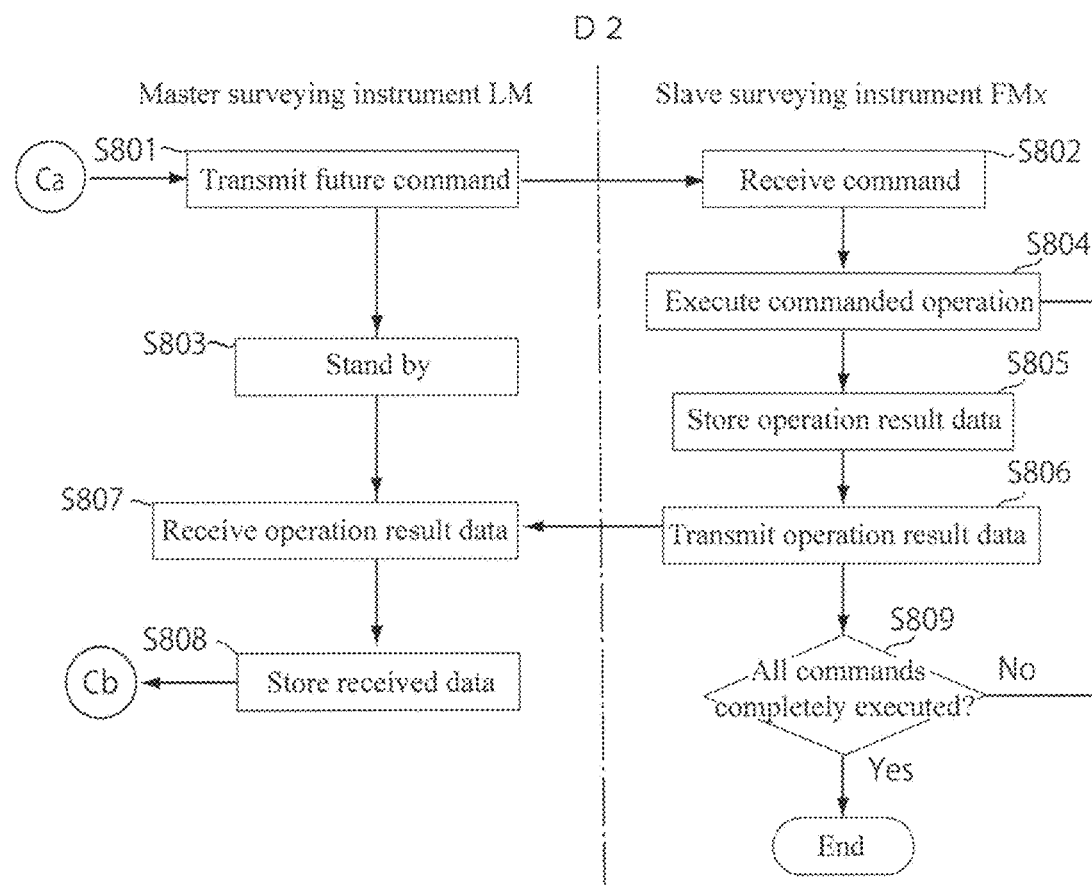
FIG. 14 is a flowchart illustrating another example of the communication pattern between the master surveying instrument and the slave surveying instrument when communication between the management server and the master surveying instrument fails in the remote operation system according to the same embodiment.

8. Communication Pattern D2 Between Master Surveying Instrument LM and Slave Surveying Instrument $FM_X$ FIG. 14 is a flowchart of operations of the master surveying instrument LM and the slave surveying instrument $FM_X$ in the communication pattern D2.

The communication pattern D2 is executed when communication between the management server MS and the master surveying instrument LM is interrupted. The communication pattern D2 corresponds to processing following the combinator Ca in the flowchart of the communication pattern A1 or A2.

In the communication pattern D2, the master surveying instrument LM transmits, as second operation commands (future commands), to the slave surveying instrument $FM_X$, a command to make the slave surveying instrument continue a measurement at the set intervals in the set period, and a command to make the slave surveying instrument transmit measurement data as operation result data to the master surveying instrument LM at a designated timing. Based on the commands, the slave surveying instrument $FM_X$ executes a measurement and transmits measurement data to the master surveying instrument LM in accordance with the timing designated in advance.

In Step S112 in the communication pattern A1 or Step S213 in the communication pattern A2, when the master surveying instrument LM fails to communicate with the management server MS, the processing shifts to Step S801 via the combinator Ca.

In Step S801, the master surveying instrument LM transmits a future command to the slave surveying instrument $FM_X$, and in Step S802, the slave surveying instrument $FM_X$ receives this future command.

Thereafter, in Step S803, the master surveying instrument LM stands by. On the other hand, the slave surveying instrument $FM_X$ executes a measurement according to the future command in Step S804.

Next, in Step S805, the slave surveying instrument $FM_X$ stores the measurement data in the storage unit 34.

Next, in Step S806, the slave surveying instrument $FM_X$ transmits the stored operation result data to the designated master surveying instrument LM that is standing by at a designated timing. Next, in Step S807, the master surveying instrument LM receives the operation result data.

Next, in Step S808, the master surveying instrument LM stores the received data in the storage unit 25. The data stored in Step S808 is transmitted to the management server MS in Step S607 in the communication pattern C1 between the management server MS and the master surveying instrument LM, via a combinator Cb.

On the other hand, the slave surveying instrument $FM_X$ judges whether all commands have been completely executed in Step S809. In the present example, whether all measurements have been completed is judged.

When there is any command that has not been completely executed in Step S809 (No), the processing returns to Step S804, and the slave surveying instrument $FM_X$ repeats the processing until all commands are completely executed.

When all commands are completely executed in Step S809 (Yes), the slave surveying instrument $FM_X$ ends the processing.

Figure 15:
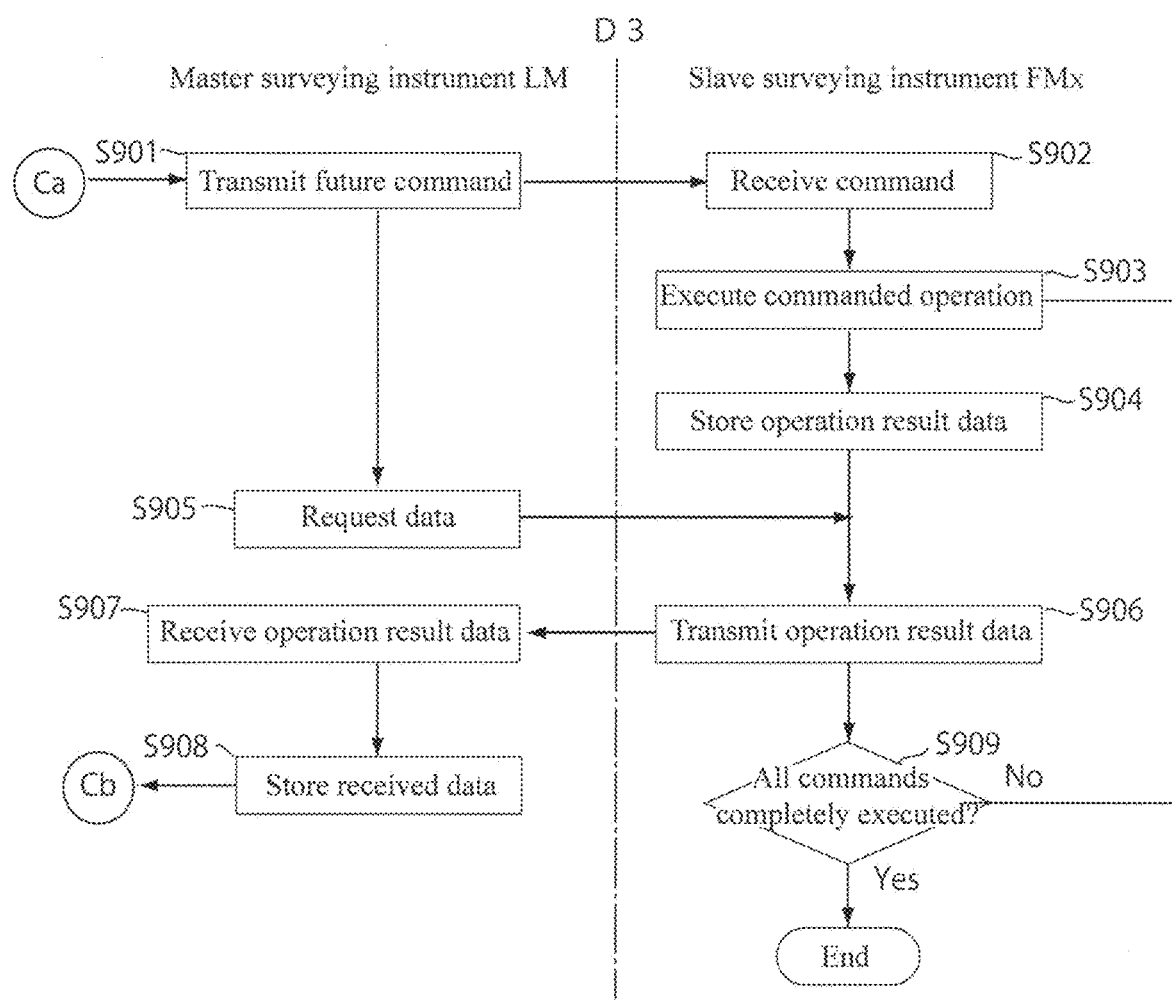
FIG. 15 is a flowchart illustrating still another example of the communication pattern between the master surveying instrument and the slave surveying instrument when communication between the management server and the master surveying instrument fails in the remote operation system according to the same embodiment.

9. Communication Pattern D3 Between Master Surveying Instrument LM and Slave Surveying Instrument $FM_X$ FIG. 15 is a flowchart of operations of the master surveying instrument LM and the slave surveying instrument $FM_X$ in the communication pattern D3.

The communication pattern D3 is executed when communication between the management server MS and the master surveying instrument LM fails. The communication pattern D3 corresponds to processing following Cain the flowchart of the communication pattern A1 or A2.

In the communication pattern D3, the master surveying instrument LM transmits, to the slave surveying instrument $FM_X$, as second operation commands (future commands), commands to make the slave surveying instrument $FM_X$ continue a measurement at the set intervals in the set period and transmit measurement data as operation result data upon request from the master surveying instrument LM. The master surveying instrument LM requests the slave surveying instrument $FM_X$ to transmit operation result data at a predetermined timing.

In Step S112 in the communication pattern A1 or Step S213 in the communication pattern A2, when the master surveying instrument LM fails to communicate with the management server MS, the processing shifts to Step S901 via the combinator Ca.

In Step S901, the master surveying instrument LM transmits a future command to the slave surveying instrument $FM_X$, and in Step S902, the slave surveying instrument $FM_X$ receives this command.

Next, in Step S903, the slave surveying instrument $FM_X$ executes a measurement according to the future command.

Next, in Step S904, the slave surveying instrument $FM_X$ stores operation result data in the storage unit 34.

Next, in Step S905, the master surveying instrument LM requests the slave surveying instrument $FM_X$ to transmit measurement data at a predetermined timing.

Next, in Step S906, the slave surveying instrument $FM_X$ transmits the operation result data stored in Step S904 to the master surveying instrument LM upon request from the master surveying instrument LM.

After receiving the operation result data in Step S907, the master surveying instrument LM stores the received data in the storage unit 25 in Step S908.

Thereafter, the processing shifts to Step S607 in the communication pattern C1 between the management server MS and the master surveying instrument LM via the combinator Cb, and the data stored in Step S908 is transmitted to the management server MS.

On the other hand, after transmitting the operation result data in Step S906, the slave surveying instrument $FM_X$ judges whether all commands have been completely executed in Step S909. In the present example, whether all measurements have been completed is judged.

When there is any command that has not been completely executed in Step S909 (No), the processing returns to Step S903, and the slave surveying instrument $FM_X$ repeats the processing until all commands are completely executed.

When all commands are completely executed in Step S909 (Yes), the slave surveying instrument $FM_X$ ends the processing.

FIG. 16A illustrates combinations of communication patterns among the management server MS, the master surveying instrument LM, and the slave surveying instrument $FM_X$ when communication between the management server MS and the master surveying instrument LM is connected in the remote operation system 10 for surveying instruments according to the present embodiment. In FIG. 16A, for example, the communication pattern X1 means that communication between the management server MS and the master surveying instrument LM is performed according to the communication pattern A1, and communication between the master surveying instrument LM and the slave surveying instrument $FM_X$ is performed according to the communication pattern B1.

FIG. 16B illustrates combinations of communication patterns among the management server MS, the master surveying instrument LM, and the slave surveying instrument $FM_X$ when communication between the management server MS and the master surveying instrument LM is interrupted in the remote operation system 10 for surveying instruments according to the present embodiment.

FIG. 16C illustrates combinations of communication patterns among the management server MS, the master surveying instrument LM, and the slave surveying instrument $FM_X$ when communication between the management server MS and the master surveying instrument LM is connected and when communication between the management server MS and the master surveying instrument LM is interrupted in the remote operation system for surveying instruments according to the present embodiment.

Thus, in the system 10 according to the present embodiment, communications between the management server MS, the master surveying instrument LM, and the slave surveying instrument $FM_X$ can be performed according to the communication patterns Z1 to Z18.

In any communication pattern used, when communication between the master surveying instrument LM and the management server MS fails due to stoppage of the management server MS or a failure of the first communication network N1 during operation according to a command from the management server MS, the master surveying instrument LM can command a future operation of the slave surveying instrument $FM_X$ to make the slave surveying instrument $FM_X$ operate without going through the management server MS. As a result, even when communication between the master surveying instrument LM and the management server MS fails, the slave surveying instruments FM can be made to continue a necessary operation.

In addition, with the system 10 according to the present embodiment, when communication between the master surveying instrument LM and the management server MS fails, the master surveying instrument LM stores untransmitted data and stands by for transmission. Further, the master surveying instrument LM can successively or periodically receive operation result data from the slave surveying instrument $FM_X$ that continues operation and store the data, so that data left untransmitted due to a failure in communication between the master surveying instrument LM and the management server MS and data acquired during the communication failure are not lost.

In addition, with the system 10 according to the present embodiment, when communication between the master surveying instrument LM and the management server MS is restored, the master surveying instrument LM transmits stored untransmitted data and data accumulated during the connection failure to the management server MS, so that data left untransmitted due to the failure in communication between the master surveying instrument LM and the management server MS and data acquired during the communication failure can be stored in the storage unit 53 of the management server MS and used.

In the case of fixed-point observation as described above, data that the master surveying instrument LM stores during a failure in communication with the management server MS is survey data, so that the data volume becomes enormous. This is significant particularly in cases such that the period until restoration is prolonged, the number of points to be measured is large, and measurement intervals are short. In such a case, when the master surveying instrument LM stores data in Steps S601, S603, S707, S808, and S908, the data may be stored in a compressed format according to date, and when communication between the master surveying instrument LM and the management server MS is restored, the data may be transmitted in the compressed format.

In the embodiment described above, each slave surveying instrument FM performs a measurement at predetermined intervals in a predetermined period as a predetermined operation, and operation result data of each slave surveying instrument is measurement data. However, without limitation to this, for example, the predetermined operation may be acquisition of environmental data such as a temperature, a humidity, and vibration, etc., by an environmental sensor incorporated in the slave surveying instrument FM, and the operation result data may be an environmental monitoring result.

The predetermined operation may be rebooting of a power supply or software updating, and the operation result data may be operation completion information. The predetermined operation may be a correcting operation, and the operation result data may be correcting operation completion information. The predetermined operation may be imaging by a camera installed in a slave surveying instrument, and the operation result data may be peripheral image data.

<Modification>

In the system 10 according to the embodiment, a system including one master surveying instrument LM and a plurality of slave surveying instruments FM is described, however, the system may be configured to include, as illustrated in FIG. 17, a plurality of master surveying instruments LM that are master surveying instruments $LM_1$ and $LM_2$.

REFERENCE SIGNS LIST

10 Remote operation system for surveying instruments
LM Master surveying instrument
FM ($FM_X$) Slave surveying instrument
RC Remote terminal
MS Management server
N1 First communication network
N2 Second communication network

What is claimed is:

1. A remote operation system for surveying instruments comprising:
at least one master surveying instrument; a management server; and a remote terminal, configured to communicate with each other via a first communication network; and at least one slave surveying instrument configured to communicate with the master surveying instrument via a second communication network, wherein the management server transmits a first operation command to make the slave surveying instrument execute a first predetermined operation to the master surveying instrument, the master surveying instrument transmits the operation command to the slave surveying instrument, and the master surveying instrument transmits a second operation command to make the slave surveying instrument execute a second predetermined operation to the slave surveying instrument when communication with the management server fails.

2. The remote operation system for surveying instruments according to claim 1, wherein the management server transmits, to the master surveying instrument, a transmission command to transmit data on the first predetermined operation to the management server, the master surveying instrument transmits the data to the management server based on the transmission command, and the master surveying instrument stands by for transmission of the data and stores data on the second predetermined operation when communication with the management server fails.

3. The remote operation system for surveying instruments according to claim 2, wherein the master surveying instrument executes data transmission for which the master surveying instrument stands by when communication with the management server is restored.

4. The remote operation system for surveying instruments according to claim 3, wherein the master surveying instrument stores the data in a compressed format according to date while communication with the management server is in failure, and transmits the data in the compressed format when communication with the management server is restored.

5. The remote operation system for surveying instruments according to claim 2, wherein the master surveying instrument stores the data in a compressed format according to date while communication with the management server is in failure, and transmits the data in the compressed format when communication with the management server is restored.

6. The remote operation system for surveying instruments according to claim 1, wherein the master surveying instrument executes data transmission for which the master surveying instrument stands by when communication with the management server is restored.

7. The remote operation system for surveying instruments according to claim 6, wherein the master surveying instrument stores the data in a compressed format according to date while communication with the management server is in failure, and transmits the data in the compressed format when communication with the management server is restored.

8. The remote operation system for surveying instruments according to claim 1, wherein the master surveying instrument stores the data in a compressed format according to date while communication with the management server is in failure, and transmits the data in the compressed format when communication with the management server is restored.

* * * * *